United States Patent [19]

Baer et al.

[11] Patent Number: 4,996,875
[45] Date of Patent: Mar. 5, 1991

[54] APPARATUS AND METHOD FOR EVALUATION OF FLUID FLOW WITHIN A COMBUSTION CHAMBER

[75] Inventors: Patrick H. Baer, Royal Oak; Timothy F. Connolly, Sterling Heights; Gerald P. Kopinski, Farmington Hills; Curtis E. Rowley, Royal Oak; Anthony W. Senkow, Yale, all of Mich.

[73] Assignee: Chrysler Corporation, Highland Park, Mich.

[21] Appl. No.: 450,888

[22] Filed: Dec. 14, 1989

[51] Int. Cl.⁵ .................................................. G01M 15/00
[52] U.S. Cl. .................................... 73/119 R; 73/865.6
[58] Field of Search ................ 73/119 R, 119 A, 865.6

[56] References Cited

U.S. PATENT DOCUMENTS 3,081,623  3/1963  Domeisen .......................... 73/119 A
4,031,759  6/1977  Jones ................................. 73/119 A

FOREIGN PATENT DOCUMENTS 1305425  4/1987  U.S.S.R. ............................ 73/119 A
1370270  6/1988  U.S.S.R. ............................ 73/119 R
1072561  6/1967  United Kingdom ............. 73/119 A Primary Examiner—Robert Raevis
Attorney, Agent, or Firm—Kenneth H. MacLean

[57] ABSTRACT

The invention provides an apparatus which simulates fluid flow patterns within a chamber. The apparatus includes a chamber having a mechanism to enable viewing of the inside of the chamber. A simulated head member is associated with the chamber to enable fluid to pass through the member into the chamber. A mechanism to exhaust fluid from the chamber is also associated therewith. A member is positioned within the chamber to simulate a piston position within the chamber. Lightweight members are within the chamber to visually define the fluid flow patterns within the chamber. Also, a method of evaluating cylinder head port, combustion chamber, and valve head designs is disclosed.

4 Claims, 2 Drawing Sheets

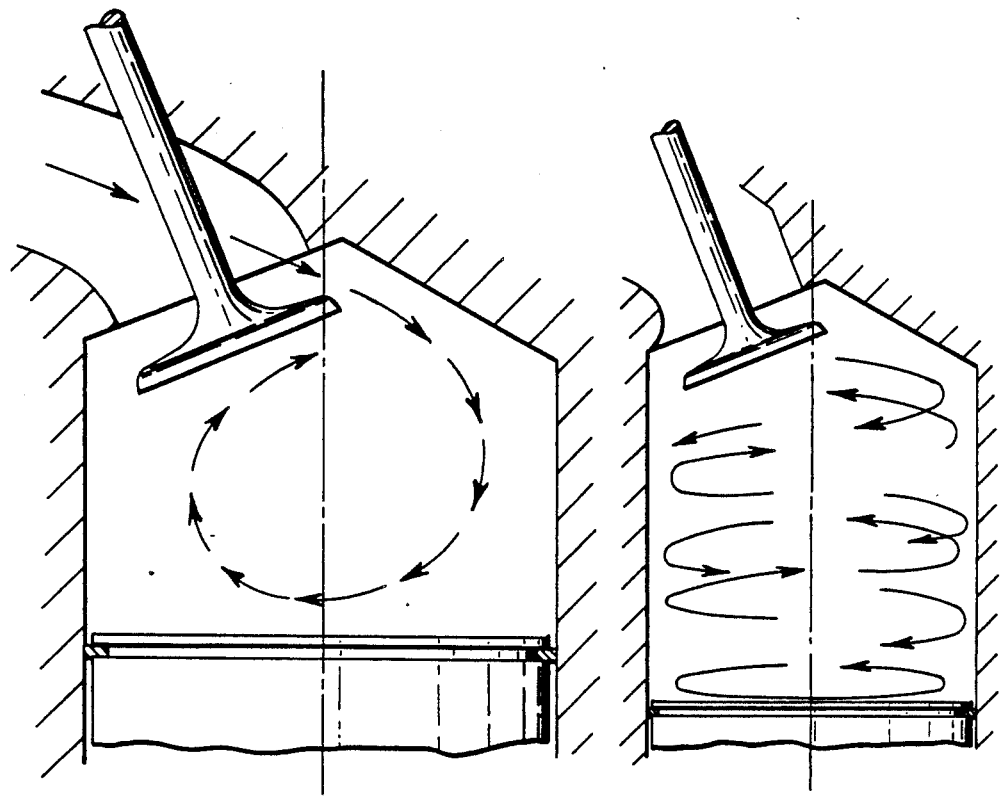
FIG. 2.
(Prior Art Flow Pattern)
FIG. 5.
(Prior Art Flow Pattern)
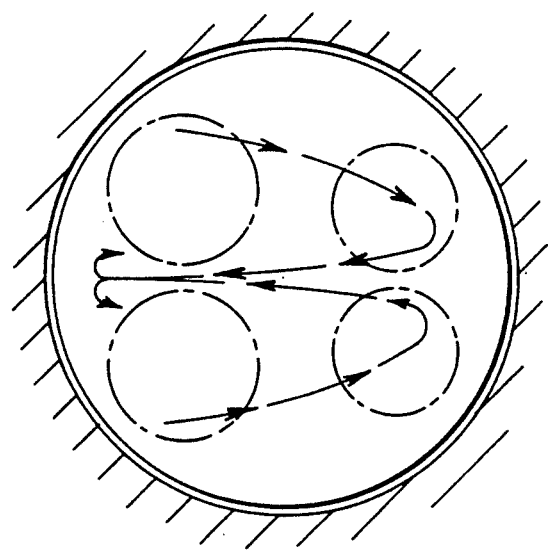
FIG. 4.
(Prior Art Flow Pattern)
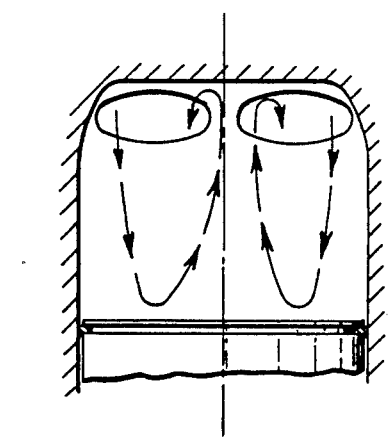
FIG. 3.
(Prior Art Flow Pattern)

APPARATUS AND METHOD FOR EVALUATION OF FLUID FLOW WITHIN A COMBUSTION CHAMBER

BACKGROUND AND SUMMARY OF THE INVENTION

The present invention relates to design of inlet valve ports, valve shrouding and the combustion chamber of a cylinder head of an internal combustion engine and, more particularly, to an apparatus and a method for analyzing particular designs of the inlet valve shrouding of particular cylinder heads.

In designing cylinder heads for combustion chambers of internal combustion engines, it is desirable to know the type of fluid flow pattern present within the cylinder while the cylinder valves are open and the cylinder is being filled with a fluid stream of air and fuel. The type of fluid flow pattern aids the designer in determining optimum characteristics for that particular combustion chamber and cylinder head. Also, the optimum fluid flow pattern aids the engine in producing more power and in reducing emissions.

Generally, two types of fluid flow patterns exist in combustion chambers of automotive internal combustion engines. One type is what is known as a swirl pattern. The fluid flow in a swirl pattern travels along the combustion chamber wall in an arcuate path substantially about the axis of the cylinder bore. The fluid flow moves in a helical pattern, as seen in FIG. 5.

The second type of fluid flow pattern is what is known as tumble flow. Tumble flow follows a substantially arcuate path substantially transverse to the axis of the cylinder bore, as shown in FIGS. 2-4.

Tumble flow is believed to offer significant advantages over other types of flow in that it promotes mixing of fuel and air within the combustion chambers which reduces the ignition delay period or in other words increases the burn rate of the engine's air/fuel. As a result, tumble flow promotes combustion stability within the combustion chambers for combustion. Additionally, tumble flow provides for better emission characteristics and results in improved engine operating economy. Thus, it is desirable to have combustion chambers which exhibit tumble flow characteristics.

With the advantages provided by tumble flow, the question arises as to why all combustion chambers do not have tumble flow. It is believed that apparatus does not exist which enable viewing of the flow patterns within a combustion cylinder to enable determination of the flow patterns within the combustion cylinder.

Therefore, it is desirous to have an apparatus which enables a determination of whether or not tumble flow will exist in a combustion chamber for a particular cylinder head. Also, the apparatus should provide information useful in the design of the cylinder heads which produce tumble flow. The apparatus should enable evaluation of tumble flow in the combustion cylinder in an attempt to optimize the flow pattern. Accordingly, it is an object of the present invention to provide the art with such an apparatus.

The present invention provides the art with an apparatus which enables viewing of flow patterns within a simulated combustion chamber. The present invention provides information useful in designing inlet valve ports of cylinder heads which produce tumble flow in their respective combustion cylinders. The present invention enables adjustment of a simulated piston to simulate various positions of a piston during the stroke of the piston in the simulated combustion chamber to enable analysis of the flow patterns within the combustion chamber cylinder. The simulated piston in the subject apparatus is in the form of a porus screen so that a continuous flow of air can pass from the valved inlet port of the cylinder head into the combustion chamber. The apparatus also uses visible and trackable lightweight members in the combustion chamber which move with the air flow away from the valved inlet ports toward the simulated piston or screen. When the lightweight members engage the piston simulator, they move along its surface in a manner similar to the flow pattern of air in an engine with a non-porus piston. Movement of the lightweight members away from the simulated piston and toward the valved inlet port simulates the air flow in an engine with a non-porus piston even though the general direction of air flow in the subject apparatus is from the ports to and through the simulated piston.

From the following detailed description taken in conjunction with the accompanying drawings and claims, other objects and advantages of the present invention will become apparent to those skilled in the art.

BRIEF DESCRIPTION OF THE DRAWINGS

FIG. 2 illustrates a cross-section view of combustion chamber forming members including a piston and a cylinder head illustrating tumble flow from a side elevation direction.

FIG. 3 is a cross-section view of the combustion chamber forming members of FIG. 2 illustrating tumble flow in a side elevation view 90° with respect to FIG. 2.

FIG. 4 is a cross-section view of the combustion chamber forming members of FIG. 2 illustrating a bottom elevation view of the tumble flow.

FIG. 5 is a cross-section view of a combustion chamber forming members illustrating swirl flow from a side elevation direction.

DETAILED DESCRIPTION OF THE PREFERRED EMBODIMENT

Figure 1:
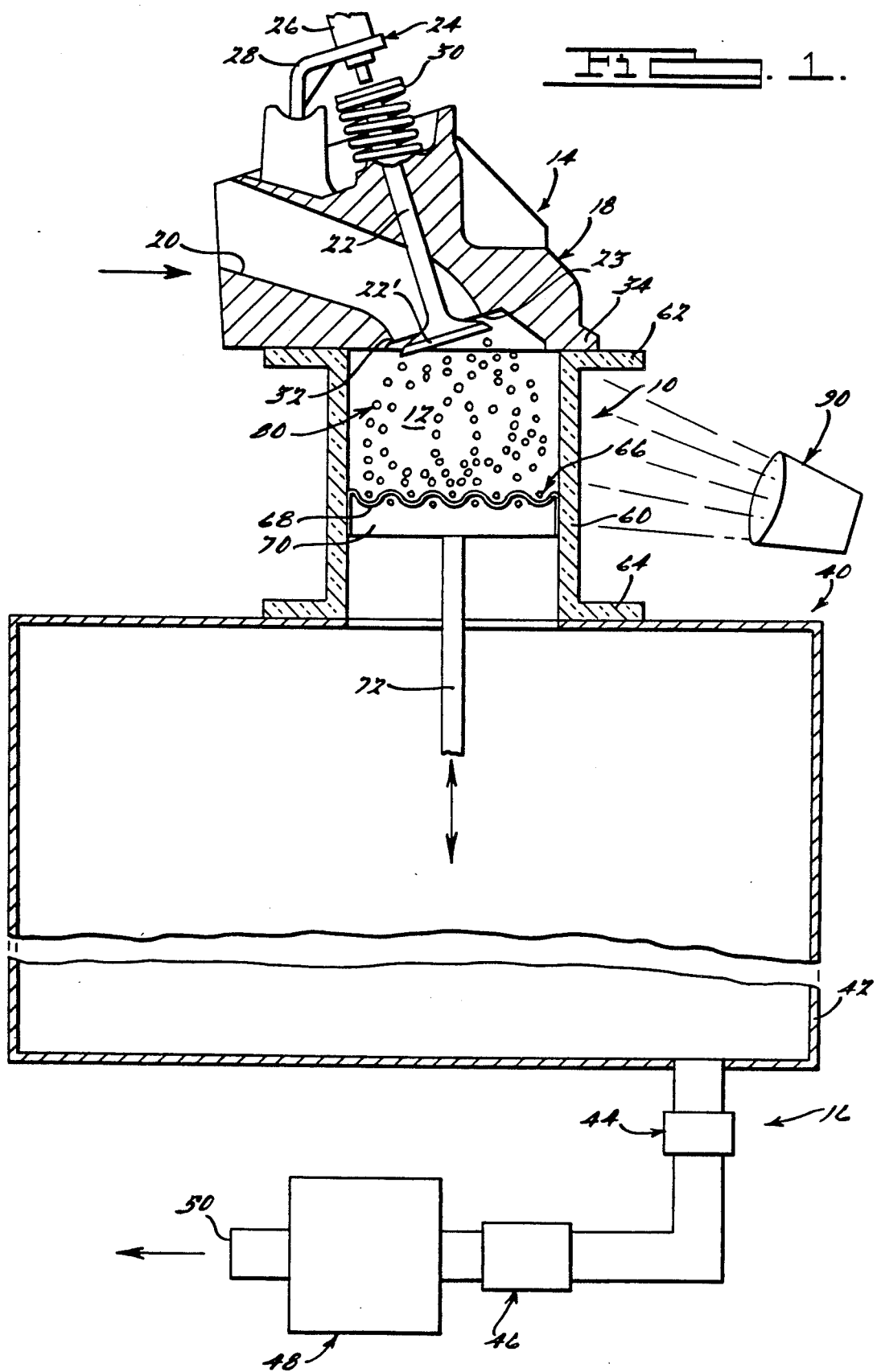
FIG. 1 is a partially cross-section view of an apparatus in accordance with the present invention.

Turning to the Figures, particularly FIG. 1, an apparatus for simulating fluid flow patterns in a chamber is illustrated. Generally, the apparatus includes a generally tubular member 10 forming a chamber 12, a mechanism 14 for directing fluid such as air into the chamber 12 and a mechanism 16 for discharging the fluid from the chamber 12.

The mechanism 14 for enabling fluid to enter into the chamber is preferably a modified cylinder head 18. Generally the cylinder head 18 includes one or more inlet passage or port 20, one or more poppet type valves 22 and a mechanism 24 for adjusting the valves 22 within the port 20.

The adjustment mechanism 24 generally includes a rotatable member 26 which may be adjusted to change the distance a lower enlarged head portion 22' of the valve 22 travel away from its seat 23. A bracket 28 mounts the rotatable member 26 to enable the rotatable member 26 to contact the upper end portion or stem portion of the valve. The rotatable member 26 overcomes the force of the valve spring 30 to enable the valves 22 to move away from its seat 23. The rotatable member 26 is finely adjustable in very small increments to control the opening distance between the valves 22 and their seats 23, which is commonly known as valve lift.

The head 18 may include an exhaust port and a valve but the exhaust valves are maintained in the closed operative position. Alternately, a head 18 could be used that did not include the exhaust port or valve.

The valve inlet port 20 generally includes one or more passages to be tested. In a three or four valve type of head, two inlet valve ports would be present. The present invention enables a working simulation of modified heads to aid in optimizing the design of the intake port and the combustion chamber. The lift of the intake valve of the particular head can be adjusted by the adjustment mechanism 24. Ordinarily, the configuration and length of the port short side, designated with reference numeral 32, will effect the tumble of the fluid flow pattern within the chamber 12. Generally, a port short side having a smaller radius will tumble at a lower valve lift than a port short side with a larger radius.

The head 18 also includes a peripheral edge or lip portion 34 to enable the head 18 to rest against or seat on the end of the chamber forming tubular member. The lip 34 could include apertures to enable fasteners to pass therethrough to secure the head 18 to the chamber forming member 10.

The mechanism 16 for enabling fluid flow is generally comprised of a flow bench 49 which includes an air box 42, a flow control valve 44, a flow meter 46, and a blower 48. The flow bench 40 enables the chamber forming member to be secured thereto to provide a support for the head 18. The flow control valve 44 controls the air flow through the chamber 12 and through the system. The flow meter 46 provides a device to measure the quantity of flow moving through the head 18 and the chamber 12. The flow control valve 44 may be adjusted in response to the flow meter to provide a desired flow through the chamber 12. The blower 48 draws fluid through the head 18, the chamber 12, the air box 42 and eventually exhausts the fluid out exhaust port 50. Thus, the blower 48 creates the pressure differential between the inlet port 20 and exhaust port 50 to draw fluid through the system.

The chamber 12 includes a transparent cylindrical tube 60 having radially outward extending flanges 62 and 64 to enable securement of the head 18 and flow table 40, respectively, with the cylinder tube 60. The transparency of the cylinder tube 60 enables the operator to view the flow within the cylinder tube 60. The cylindrical tube 60 may be sized to correspond with desired sizes of particular vehicle combustion chamber cylinders which are to be tested.

Within the cylinder tube 60 is a member 66 which simulates the position of a piston within a combustion chamber cylinder. The member 66 includes a screen 68 and an outer peripheral band 70. The screen 68 enables the fluid flow to pass through the member 66. The member 66 is vertically adjustable within the cylinder 60 by rod 72. The rod 72 enables the member 66 to be positioned at any desired vertical position along the cylinder tube 60. Thus, the member 66 may simulate different positions of the piston which correspond to a given valve lift. The simulated poston in the subject apparatus is in the form of a porus screen so that a continuous flow of air can pass from the valved inlet port of the cylinder head into the combustion chamber. The apparatus also uses visible and trackable lightweight members in the combustion chamber which move with the air flow away from the valved inlet ports toward the simulated piston or screen. When the lightweight members engage the piston simulator, they move along its surface in a manner similar to the flow pattern of air in an engine with a non-porus poston. Movement of the lightweight members away from the simulated piston and toward the valved inlet port simulates the air flow in the engine with a non-porus piston even though the general direction of air flow in the subject apparatus is from the ports to and through the simulated piston.

A plurality of lightweight members 80 are positioned within the cylinder tube 60 above the member 66 within the space between the member 66 and the head 18. The member 66 maintains the members 80 within the simulated combustion chamber 12. The lightweight members 80 travel in the fluid stream entering from the port 20. The lightweight members 80 initially travel downwardly along and in the path defined by the a main and stronger portion of the fluid stream. Referring to FIG. 2, this main or stronger portion of the flow past the head 22' is created by the earlier referenced configuration of the seat 32 in relation to the head 22' and create the tumble flow shown in FIG. 2. The flow pattern in a real combustion chamber is simulated in the apparatus shown in FIG. 1 by a circular movement of the particles 80. Specifically, the particles first move downward with the stronger portion of the flow until they engage the screen 68. Thereafter, the movement is in a clockwise circular motion, first to the left along the screen 68 and then upwardly toward the valve head 22'. This pattern simulates the pattern shown in FIG. 2 by containing the particles 80 in said cylinder tube 60 to provide visual tracking of fluid flow entering tube 60 and hence simulate inlet flow into a combustion chamber cylinder of an internal combustion engine.

The members 80 are generally formed from a colored foam material and are spherical in shape. The lightweight members 80 are either coated with a fluorescent coating or paint or formed from a fluorescent type foam to enable better visualization within the chamber 12.

An illumination mechanism 90 is utilized to provide better viewing of the flow pattern of the lightweight members 80. When florescent materials are utilized, the illumination mechanism 90 is generally an ultraviolet light, black light or the like to provide light rays which cause the lightweight members to fluoresce thereby providing high visibility of the lightweight members 80.

In use, the blower 48 is energized to create a pressure differential across the inlet port 20 and the exhaust port 50. Fluid is drawn through the port 20 past the valve 22 and into the chamber 12. With a desirable tumble inducing port design, the fluid is drawn past the valve 22 into the chamber 12 and a portion will circulate within chamber 12 before being drawn through the screen 68 in member 66. The lightweight members 80 are drawn into the fluid path and along the fluid stream in the patterns typically illustrated in FIGS. 2-5. The members 80 are shown suspended in a pattern caused by the air flow as illustrated in FIG. 1. The particular fluid path in the chamber 12 is dependent upon the size of the cylinder, position of the member 66, the head porting design, and the valve lift at a particular air flow rate through the system. The valve lift may be adjusted by the mechanism 24 to provide the particular head 18 with alternate valve lifts to optimize the flow path within the cylinder tube 60.

The illumination mechanism 90 is illuminated to provide better viewing of the lightweight fluorescent members 80 within the chamber 12. Generally a video camera or the like is utilized to record a visual impression of the flow path or pattern within the chamber 12 as indicated by movement of members 80. From the information provided by the visualization of the flow pattern, the designer can further work to optimize the above characteristics to provide optimum tumble flow.

FIGS. 2-4 illustrate the tumble flow path within a cylinder. Generally, the flow is in an arcuate or circular path transverse to the axis of the cylinder. The tumble flow pattern provides the internal combustion engine with the above described characteristics. FIG. 5 illustrates a spiral type of flow within a combustion chamber.

While the above describes a preferred embodiment of the present invention, it will be understood that modifications, variations and alterations may be made to the present invention without deviating from the scope and fair meaning of the subjoined claims.

What is claimed is:

1. An apparatus for simulating and viewing fluid flow patterns in combustion chambers comprising:
    a chamber having one or more ends and a means for enabling viewing the interior of said chamber;
    means for enabling fluid entry into said chamber, said entry means simulating a valve head, said entry means being coupled with one end of said chamber, wherein said means for enabling fluid entry into said chamber is a modified cylinder head for an internal combustion engine;
    fluid exit means for enabling fluid out of said chamber, said exit means being coupled with said chamber;
    a member simulating a piston position in said chamber, said member enabling fluid to pass therethrough to said exit means, wherein said piston position simulating member is adjustably positionable in said chamber; means for visually indicating fluid flow patterns in said chamber, said visual indicating means including members positioned in said chamber and moveable by the fluid flow to define flow patterns of the fluid flow.

2. An apparatus for simulating and viewing fluid flow patterns in combustion chambers comprising:
    a chamber having one or more ends a means for enabling viewing the interior of said chamber;
    means for enabling fluid entry into said chamber, said entry means simulating a valve head, said entry means being coupled with one end of said chamber;
    fluid exit means for enabling fluid out of said chamber, said exit means being coupled with said chamber;
    a member simulating a piston position in said chamber, said member enabling fluid to pass therethrough to said exit means; and
    means for visually indicating fluid flow patterns in said chamber, said visual indicating means including members positioned in said chamber and moveable by the fluid flow to define flow patterns of the fluid flow, wherein said visual indicating means members comprise a plurality of members of lightweight material able to be carried by said fluid flow.

3. An apparatus for enabling design of valved cylinder head ports and combustion chambers comprising:
    a transparent sleeve defining a cylinder bore, said sleeve having two ends;
    a cylinder head including inlet valve porting to be evaluated coupled with one end of said sleeve, said cylinder head including means for enabling fluid entry through said inlet valve portion into said sleeve;
    means for exhausting fluid from said sleeve, said exhaust means being coupled with said sleeve;
    a member within said sleeve for simulating the position of a piston, said member enabling fluid flow to pass therethrough, wherein said piston simulating member is adjustably positionable in said chamber;
    lightweight members in said sleeve, said lightweight members traveling in one or more fluid streams passed into said sleeve to as to thereby define one or more fluid patterns in said sleeve for the evaluated cylinder head porting.

4. An apparatus for enabling design of valved cylinder head ports and combustion chambers comprising:
    a transparent sleeve defining a cylinder bore, said sleeve having two ends;
    a cylinder head including inlet valve porting to be evaluated coupled with one end of said sleeve, said cylinder head including means for enabling fluid entry through said inlet valve porting into said sleeve;
    means for exhausting fluid from said sleeve, said exhaust means being coupled with said sleeve;
    a member within said sleeve for simulating the position of a piston, said member enabling fluid flow to pass therethrough; and
    lightweight members in said sleeve, said lightweight members are formed from foam and traveling in one or more fluid streams passed into said sleeve so as to thereby define one or more fluid patterns in said sleeve for the evaluated cylinder head porting.

* * * * *